United States Patent
Chandler et al.

(10) Patent No.: US 6,257,066 B1
(45) Date of Patent: Jul. 10, 2001

(54) PORTABLE VIBRATION MONITORING DEVICE

(75) Inventors: Jon K. Chandler, Bainbridge Island; Orris L. Dent, Kingston, both of WA (US)

(73) Assignee: Reid Asset Management Company, Willoughby Hills, OH (US)

( * ) Notice: Subject to any disclaimer, the term of this patent is extended or adjusted under 35 U.S.C. 154(b) by 0 days.

(21) Appl. No.: 09/083,077

(22) Filed: May 21, 1998

(51) Int. Cl.$^7$ .................................................. G01N 29/00
(52) U.S. Cl. .................................................. 73/660; 73/602
(58) Field of Search ............................. 73/649, 655, 656, 73/658, 659, 489, 491, 495, 498, 499, 1.82, 602; 702/56, 189, 190, 67, 68, 141, 142, 150; 340/669, 683, 691.3, 517, 521, 522, 525, 815.4, 815.69; 345/34–36, 39–40

(56) References Cited

U.S. PATENT DOCUMENTS

| | | | |
|---|---|---|---|
| 4,021,647 | 5/1977 | Meier | 235/92 T |
| 4,312,232 * | 1/1982 | Stoutenburg | 73/659 |
| 4,325,223 | 4/1982 | Cantley | 62/126 |
| 4,399,513 * | 8/1983 | Sullivan et al. | 364/551 |
| 4,408,285 * | 10/1983 | Sisson et al. | 73/602 |
| 4,457,163 | 7/1984 | Jackle | 73/405 A |
| 4,535,411 * | 8/1985 | Blackburn et al. | 73/602 |
| 4,553,400 | 11/1985 | Branz | 73/313 |
| 4,612,775 | 9/1986 | Branz et al. | 62/126 |
| 4,622,548 | 11/1986 | Andres et al. | 73/492 |
| 4,707,688 * | 11/1987 | Thomas | 73/660 |
| 4,796,994 * | 1/1989 | Bager | 356/358 |
| 4,800,512 | 1/1989 | Busch | 73/660 |
| 4,827,771 | 5/1989 | Cary et al. | 73/661 |
| 4,840,372 | 6/1989 | Oglesby et al. | 272/72 |
| 4,885,707 | 12/1989 | Nichol et al. | 73/660 |
| 4,925,121 * | 5/1990 | Tapscott et al. | 242/57 |
| 5,008,619 * | 4/1991 | Keogh et al. | 324/262 |
| 5,094,107 | 3/1992 | Schoch | 73/570 |
| 5,109,700 * | 5/1992 | Hicho | 73/660 |
| 5,161,922 * | 11/1992 | Malloy | 408/14 |
| 5,379,643 | 1/1995 | Taylor | 73/654 |
| 5,396,801 | 3/1995 | Komura | 73/662 |
| 5,435,168 * | 7/1995 | Granere | 73/663 |
| 5,517,183 * | 5/1996 | Bozeman, Jr. | 73/503 |
| 5,518,008 | 5/1996 | Cucchiaro et al. | 128/777 |
| 5,544,073 | 8/1996 | Piety et al. | 364/508 |
| 5,631,427 | 5/1997 | Bridges | 73/658 |
| 5,633,811 * | 5/1997 | Canada et al. | 364/576 |
| 5,680,025 | 10/1997 | Bowers, III et al. | 318/806 |
| 5,710,723 * | 1/1998 | Hoth et al. | 364/554 |
| 5,726,911 | 3/1998 | Canada et al. | 364/550 |
| 5,808,903 * | 9/1998 | Schiltz et al. | 73/570 |
| 5,814,733 * | 9/1998 | Khoury et al. | 73/658 |
| 5,943,634 * | 8/1999 | Piety et al. | 702/56 |
| 5,992,237 * | 11/1999 | McCarty et al. | 73/660 |

\* cited by examiner

*Primary Examiner*—Helen Kwok
(74) *Attorney, Agent, or Firm*—Renner, Otto, Boisselle & Sklar, LLP (57) ABSTRACT

A portable vibration monitoring device which includes an accelerometer mounted on a machine to measure the vibration of the machine, and a display to display the results. The results are displayed, for example, on four bargraphs to indicate good/marginal/unacceptable vibration levels. Additionally, the bargraphs provide an indication of the type of problem resulting in high vibration levels. Examples of such problem types include, but are not limited to, machine imbalance, misalignment, and general fault conditions.

34 Claims, 10 Drawing Sheets

|  | 900 | 1200 | 1800 | 3600 |
|---|---|---|---|---|
| ACCELERATION (66) | $Ga_{900}$ | $Ga_{1200}$ | $Ga_{1800}$ | $Ga_{3600}$ |
| VELOCITY (80) | Gv | Gv | Gv | Gv |
| DISPLACEMENT (88) | $Gd_{900}$ | $Gd_{1200}$ | $Gd_{1800}$ | $Gd_{3600}$ |
| CREST FACTOR (91) | $Gc_{900}$ | $Gc_{1200}$ | $Gc_{1800}$ | $Gc_{3600}$ |

PORTABLE VIBRATION MONITORING DEVICE

TECHNICAL FIELD

The present invention relates generally to vibration analysis, and more particularly to a portable vibration monitoring device useful as part of a predictive maintenance program.

BACKGROUND OF THE INVENTION

Vibration analysis is known in the art as an effective tool in a predictive maintenance program for machinery. Conventional vibration based predictive maintenance programs rely on Fast Fourier Transform (FFT) generated vibration signatures, collected using a portable data collector, and an expert system to process the data and determine which machinery needs attention. Increasingly, permanently installed systems are being used, both to provide continuous monitoring of critical machinery, and to reduce labor costs of data collection.

Such conventional technology, while effective, has various drawbacks associated therewith which limit applications to facilities having large costly machines, or critical machines where unexpected shutdowns are unacceptable. For example, the portable data collectors are complex devices which are expensive to design and build. The analysis of the vibration data using either manual or automated techniques requires a significant amount of study to be effective, and skilled labor to analyze the data and interpret the results.

Furthermore, data acquisition is costly because of the labor involved. The software which drives the technology is complex and expensive. Moreover, there is much set up time involved with configuring the data analysis to a new machine.

Simpler devices, known as vibration meters, measure the vibration from a machine and compare a single broadband level to a threshold. Such approach can be effective for detecting the deterioration of a machine, but the approach is severely limited because the overall level is controlled by the highest peak in the measured vibration. The overall vibration level may not change at all even though serious deterioration in the machine may be occurring.

In view of the aforementioned shortcomings associated with the above-described conventional approaches, there is a strong need in the art for a vibration monitoring device which is cost-effective even in smaller facilities with perhaps only a few machines. There is a strong need for a device which employs relatively low cost hardware/software, and which may be utilized by low skill workers without requiring significant training. On the other hand, there is a strong need for a simpler device which is not limited to measuring overall vibration level so as to be susceptible to false positive diagnoses.

SUMMARY OF THE INVENTION

The present invention relates to a vibration monitoring device that is portable, low cost, and still provides useful information regarding machine condition. In the hands of a plant mechanic or equipment operator, the present invention provides a quick indication of machinery condition. In addition, the invention provides information to aid in determining the underlying mechanical faults causing unacceptable vibration levels.

The portable vibration monitoring device uses an accelerometer mounted on a machine to measure the vibration of the machine, and a display to display the results. The results are displayed, for example, on four bargraphs to indicate good/marginal/unacceptable vibration levels. Additionally, the bargraphs provide an indication of the type of problem resulting in high vibration levels. Examples of such problem types include, but are not limited to, machine imbalance, misalignment, and general fault conditions.

The portable vibration monitoring device of the present invention measures the overall vibration displacement, velocity and acceleration levels. Each of these measurements is displayed on a respective bargraph and emphasizes a different part of the vibration signature (frequency band) of the machine under test. Consequently, small changes which would not be seen with a single measurement have a better chance of being observed. Moreover, such taking of measurements that emphasize different frequency ranges also provides some indication as to the frequency of the vibration, to allow analysis of the cause of the increased vibration levels.

According to one particular aspect of the invention, a portable vibration monitoring device is provided. The portable vibration monitoring device includes a portable housing; an accelerometer which may be mounted to a machine under test, the accelerometer providing an output signal representative of the acceleration of the machine; at least one integrator within the housing for processing the output signal to produce three measurands corresponding respectively to measured acceleration, velocity and displacement of the machine; scaling circuitry within the housing for scaling the levels of the three measurands relative to each other according to a predetermined relationship; and a display exposed via the housing for displaying the scaled levels of the three measurands in a manner which is indicative of a particular frequency content of the output signal.

According to another aspect of the invention, a portable vibration monitoring device is provided which includes a portable housing; a transducer which may be mounted to a machine under test, the transducer providing an output signal related to movement of the machine; processing circuitry within the housing for deriving acceleration, velocity and displacement measurands based on the output signal; scaling circuitry within the housing for scaling the levels of the measurands relative to each other according to a predetermined relationship; and a display exposed via the housing for displaying the scaled levels of the three measurands in a manner which is indicative of a particular frequency content of the output signal.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference numerals are used to refer to like elements throughout.

Figures 1, 2:
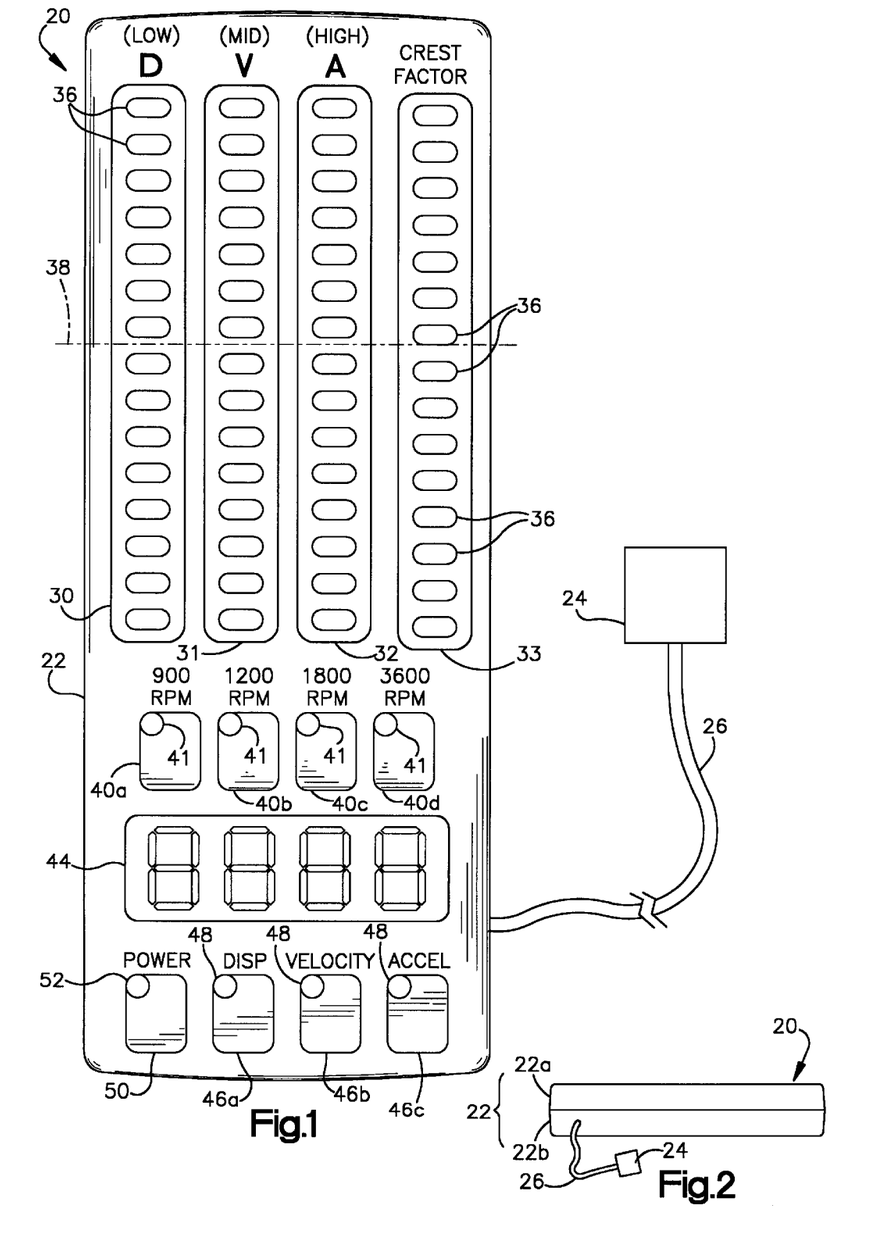
FIG. 1 is a top view of an exemplary portable vibration monitoring device in accordance with the present invention.
FIG. 2 is a side view of the portable vibration monitoring device in accordance with the present invention.

Referring initially to FIG. 1, a vibration monitoring device in accordance with the present invention is designated 20. The device 20 includes a portable, hand-held sized housing 22 made of lightweight, high-strength plastic or the like. The device 20 further includes a transducer 24 in the form of a conventional accelerometer which may be mounted to a machine under test (not shown). The transducer 24 preferably is of the type which can be mounted magnetically to the machine. Alternatively, the transducer 24 may be mounted mechanically to the machine via a mounting block or the like without departing from the scope of the invention.

A transducer cable 26 couples the transducer 24 to the housing 22 as shown in FIG. 1. Specifically, the transducer cable 26 serves to couple an electrical signal output from the transducer 24 to the housing 22 via a BNC style connector (not shown), for example, located on the housing 22. As is known, the output of the transducer 24 is indicative of the acceleration experienced by the machine under test. The signal is then processed by the device 20 as is described in more detail below in relation to FIG. 3.

In the exemplary embodiment, the device 20 includes four bargraphs 30–33 aligned in parallel and exposed via respective apertures in the housing 22. As will be described in more detail below, the bargraphs 30–33 respectively display the overall root-mean-square (rms) levels of displacement, velocity, acceleration and crest factor measurements as obtained based on the output of the transducer 24. Each bargraph 30–33 includes fifteen segments 36 configured to be illuminated upwardly in predefined steps as a function of increasing signal level. Each segment 36 is made up of a respective light emitting diode (LED).

The segments 36 in each of the bargraphs 30–32 which are located below a threshold line 38 (shown in phantom) are made up of green LEDs indicative of satisfactory operation. The segments 36 which are located above the threshold line 38 in the bargraphs 30 and 32 (representative of displacement and acceleration, respectively) are made up of amber LEDs indicative of potentially problematic operation. The segments 36 which are located above the threshold line 38 in the bargraph 31 (representative of velocity) are made up of red LEDs, also to indicate potentially problematic operation. All of the segments 36 in the bargraph 33 (representative of crest factor) are made up of amber LEDs.

Although various colors for the bar graph segments are described herein for purposes of illustration, it will be appreciated that the invention is not limited to a particular color scheme. Rather, it is the differences in color and/or level between the different bargraphs which serves to convey information to the operator in accordance with the invention.

The device 20 also includes a first set of pushkeys 40a–40d mounted in the housing 22 for allowing an operator to input the operating frequency of the machine under test. For example, the device 20 described herein is designed for use with machines which operate at or about either 900, 1200, 1800 or 3600 rpm. The operator inputs the operating frequency of the machine under test simply by depressing the pushkey 40a–40d which corresponds most closely to the particular operating frequency (e.g., 900, 1200, 1800 and 3600, respectively). LEDs 41 immediately adjacent the respective pushkeys 40a–40d are illuminated to indicate the most recently pressed pushkey 40a–40d in order to provide to the operator an indication of the current configuration of the device 20.

As will be described in more detail in relation to FIGS. 3 and 4 below, the portable vibration monitoring device 20 uses the operating speed information input via the pushkeys 40a–40d to configure the device 20 to perform a measurement. More specifically, the device 20 includes a plurality of filters and adjustable scalers which scale the displacement, vibration and acceleration measurements relative to one another based on the operating speed. These scaled measurements are then displayed, respectively, on the bargraphs 30–32 in such a manner so as to provide an indication of the frequency content of the vibration signal. The manner in which such scaled measurements are able to provide such information is discussed below in more detail with respect to FIGS. 7(a)–7(c) thru 10(a)–10(f). As will also be explained, such information is indicative of the machine condition beyond that which is ordinarily obtained from a single broadband measurement. Such approach represents an extension of a technique generally referred to as Chapman numbers.

The device 20 further includes a four-digit display 44 which serves to provide a digital readout of the measured rms levels for displacement, velocity and acceleration. More specifically, the device 20 includes a second set of pushkeys 46a–46c corresponding to displacement, velocity and acceleration, respectively. Depressing the pushkey 46a causes the measured displacement to be displayed on the display 44. Similarly, depressing the pushkeys 46b and 46c cause the measured velocity and acceleration, respectively, to be displayed via the display 44. LEDs 48 located immediately adjacent the pushkeys 46a–46c are illuminated to reflect the most recently pressed key so as to indicate to the operator the measurand currently being shown on the display 44.

In addition, the device 20 includes a pushkey 50 for turning the device 20 on and off. An LED 52 located adjacent to the pushkey 50 is illuminated to show when the device 20 is in a power on condition. Alternatively, the LED 52 may be omitted as one or more other LEDs will be illuminated in all cases when the device 20 is on.

FIG. 2 is a side view of the device 20. In the exemplary embodiment, the housing 22 is made up of an upper half 22a and a lower half 22b. Stored within the housing 20 are the various electronic components which make up the device 20 as is discussed in more detail in relation to FIG. 3.

Figure 3:
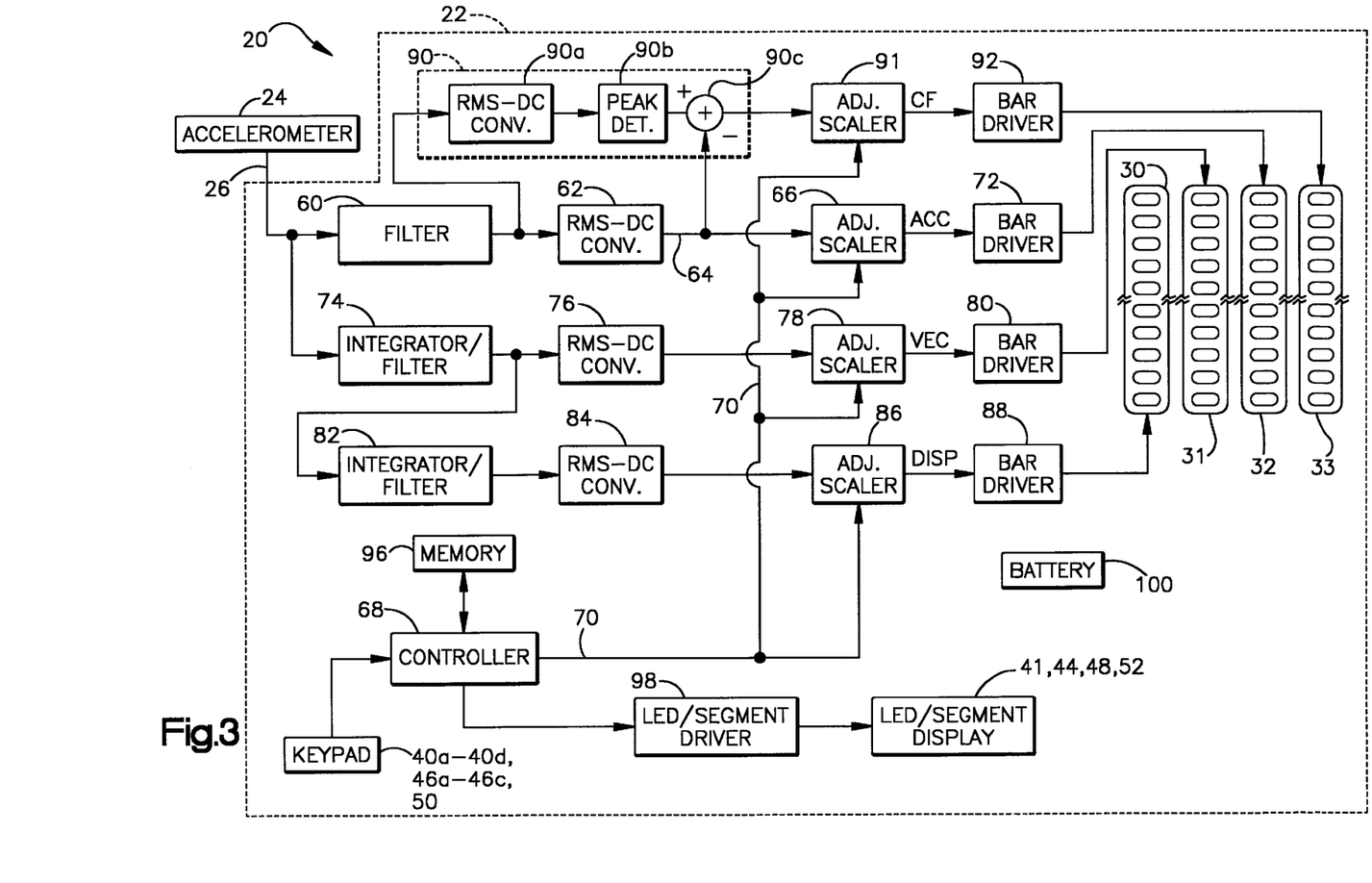
FIG. 3 is a block diagram illustrating the various components making up the portable vibration monitoring device in accordance with the present invention.

Turning now to FIG. 3, a detailed block diagram of the portable vibration monitoring device 20 is shown. As mentioned above, the transducer 24 preferably is made up of a conventional accelerometer (e.g., ICP complaint standard accelerometer) which provides at its output an ac signal which is indicative of the acceleration (and hence, vibration) of the machine under test. The output of the transducer 24 is input via the cable 26 to a filter 60 within the housing 22. The filter 60 preferably is an analog bandpass filter with its low and high cutoff frequencies at 10 Hz and 10 Khz, respectively. Such band defines the range of frequencies expected to be encountered by the device 20, and may be some other band in a different embodiment as will be appreciated.

The transducer output signal is filtered by the filter 60 and output to an rms-to-dc converter 62. The rms-to-dc converter 62 converts the rms level of the filtered signal to a dc signal using known techniques and outputs a dc signal on line 64 indicative of the measured acceleration. The converted output from the rms-to-dc converter 62 is then input to an adjustable scaler 66 which scales the converted signal to produce a dc signal ACC. The signal ACC represents the measured acceleration signal scaled in accordance with the present invention as will be described below.

The adjustable scaler 66 is designed to apply a selected amount of gain to the acceleration signal provided on line 64. The amount of gain is controlled by a controller 68 included in the device 20. More specifically, the controller 68 provides a control signal via control bus 70 which adjusts the amount of gain provided by the adjustable scaler 66. Such adjustable gain may be carried out via known analog or digital circuitry or a combination thereof.

The digital output signal ACC from the adjustable scaler 66 is then coupled to a bargraph driver 72. The output of the bargraph driver 72 is connected to the bargraph 32. The bargraph driver 72 and bargraph 32 are configured so as to illuminate the various segments 36 in 3 db steps (representing units of acceleration). Consequently, as the ACC signal increases/decreases the number of segments illuminated in the bargraph 32 will correspondingly increase/decrease in 3 db steps. It will be appreciated, however, that other increments may be selected in different embodiments without departing from the scope of the invention.

The output signal from the transducer 24 is also input to an integrator/filter 74 which integrates and filters the signal. Specifically, the integrator/filter 74 is made up of conventional analog circuitry which serves to integrate the output of the accelerometer so as to be representative of the velocity of the machine under test. The integrator/filter 74 also includes a filtering component which serves as a low-pass filter to filter the output of the transducer 24. In the exemplary embodiment, the filter within the integrator/filter 74 has a cutoff frequency of 10 Hz with a rolloff of −6 db/octave up through 10 Khz.

The output from the integrator/filter 74 is provided to an rms-to-dc converter 76 equivalent to the converter 62 described above. The dc signal output from the converter 76 is representative of the velocity of the machine under test as will be appreciated. The dc signal is then input to an adjustable scaler 78 which is similar in construction and operation to the adjustable scaler 66 described above. The gain of the scaler 78 is controlled by the controller 68 based on the operating speed of the machine under test via the control bus 70. The output of the adjustable scaler 78 represents the scaled velocity measurement VEC which is input to a bargraph driver 80. The bargraph driver 80 is operatively configured with the bargraph 31 in the same manner as the bargraph driver 72 and bargraph 32 discussed above. Consequently, as the velocity signal ACC increases/decreases the number of segments illuminated in the bargraph 31 will correspondingly increase/decrease in 3 db steps (representing units of velocity).

The output from the integrator/filter 74 also is coupled to the input of an integrator/filter 82. The integrator/filter 82, like the integrator/filter 74, has a cutoff frequency of 10 Hz with a rolloff of −6 db/octave up through 10 Khz. The integrator/filter 82 further integrates the once integrated output of the accelerometer to produce a signal indicative of the displacement of the machine under test. The output from the integrator/filter 82 is input to an rms-to-dc converter 84 which is similar in configuration to the rms-to-dc converters 62 and 76. The output from the rms-to-dc converter 84 is input to an adjustable scaler 86 of the same type as the adjustable scalers 66 and 78 described above. The output of the scaler 86 represents the scaled displacement measurement signal DISP representing the measured displacement of the machine under test. The controller 68 controls the gain of the adjustable scaler 86 via the control bus 70, again based on the operating speed of the machine under test.

The output of the adjustable scaler 86 is input to a bargraph driver 88. The bargraph driver 88 is operatively configured with the bargraph 30 in the same manner as the bargraph drivers 72, 80 and bargraphs 32, 31 discussed above. Consequently, as the displacement signal DISP increases/decreases the number of segments illuminated in the bargraph 30 will correspondingly increase/decrease in 3 db steps (representing units of displacement).

The vibration monitoring device 20 further includes a crest factor detection circuit 90 which receives as an input the output from the filter 60.

The crest factor detection circuit 90 includes an rms-to-dc converter 90a which receives the output from the filter 60. The output of the converter 90a is input to a peak detector 90b included in the detection circuit 90. The output of the peak detector 90b is input to a positive input of an adder 90c. The output from the acceleration converter 62 is provided to a negative input of the adder 90c such that a crest factor is determined to be the difference in decibels between the peak detector 90b output and the rms-dc output on line 64.

The acceleration rms-to-dc converter 62 has a relatively long time constant, such that its output is stable with time. The crest factor rms-to-dc converter 90a has a short time constant, such that its output is characteristic of the absolute value of the instantaneous acceleration. This output is peak detected and filtered via the peak detector 90b. Accordingly, the crest factor is represented by the difference between the output of the peak detector 90b and the converter 64 as output by the adder 90c.

The output of the adder 90c is coupled to an adjustable scaler 91, the gain of which is controlled by the controller 68 based on the selected machine speed. The gain of the scaler 91 is predetermined using calibration such that the output of the crest factor is always 3 db above the output of the rms-to-dc converter 64 for a sinusoidal input (other waveforms will have different peak-to-rms crest factors). The scaled signal then represents the crest factor CF in db which is then input to a bargraph driver 92. The bargraph driver 92 is operatively configured with the bargraph 33 in the same manner as the other bargraph drivers and bargraphs discussed above, with the exception that the segments 36 are configured in 2 db steps. Consequently, as the crest factor signal CF increases/decreases the number of segments 36 illuminated in the bargraph 33 will correspondingly increase/decrease.

Continuing to refer to FIG. 3, the monitoring device 20 includes a non-volatile memory 96 coupled to the controller 68. As will be described below in association with FIG. 5, the memory 96 has stored therein gain values which the adjustable scalers 66, 78, 86 and 91 apply to their respective signals for each predefined operating speed. Specifically, the controller 68 is configured to receive as an input from the keys 40a–40d a signal indicating the operating speed of the machine under test as input by the operator. In response, the controller 68 looks up in the memory 96 the gain values which correspond to such operating speed. The controller 68 then provides corresponding control signals to each of the adjustable scalers 66, 78, 86 and 91 via the bus 70 in order to adjust the scalers to provide the corresponding gain values. The respective gain values for each operating speed are predetermined as described below in connection with FIG. 4. Thereafter, the gain values are stored in the memory 96 using conventional techniques.

The controller 68 also receives as an input a signal from the keys 46a–46c which is indicative of which particular measurand is to be displayed via the display 44. Based on which key 46a–46c was depressed most recently, the controller 68 causes the measured acceleration ACC, velocity VEC or displacement DISP to be displayed on the display 44 via an LED/segment driver 98. Although not shown, the controller 68 selectively controls which of the acceleration, velocity and displacement measurements is displayed on the display 44 based on the input keys 46a–46c via multiplexor or the like coupled between the outputs of the adjustable scalers 66, 78 and 86, and the LED/segment driver 98.

The controller 68 is configured to illuminate, via the driver 98, the respective LEDs 41, 48 and 52 based on which of the particular keys 40a–40d, 46a–46c and 50 has been depressed. In addition, the device 20 includes a battery 100 which serves to provide the necessary power to each of the components in the device. Such battery 100 may be a rechargeable battery or disposable alkaline battery, for example, as will be appreciated. Part of the appeal of the present invention is that the relatively low number of components and the associated low power consumption enables the device to operate for extended periods of time with disposable batteries.

Figure 4:
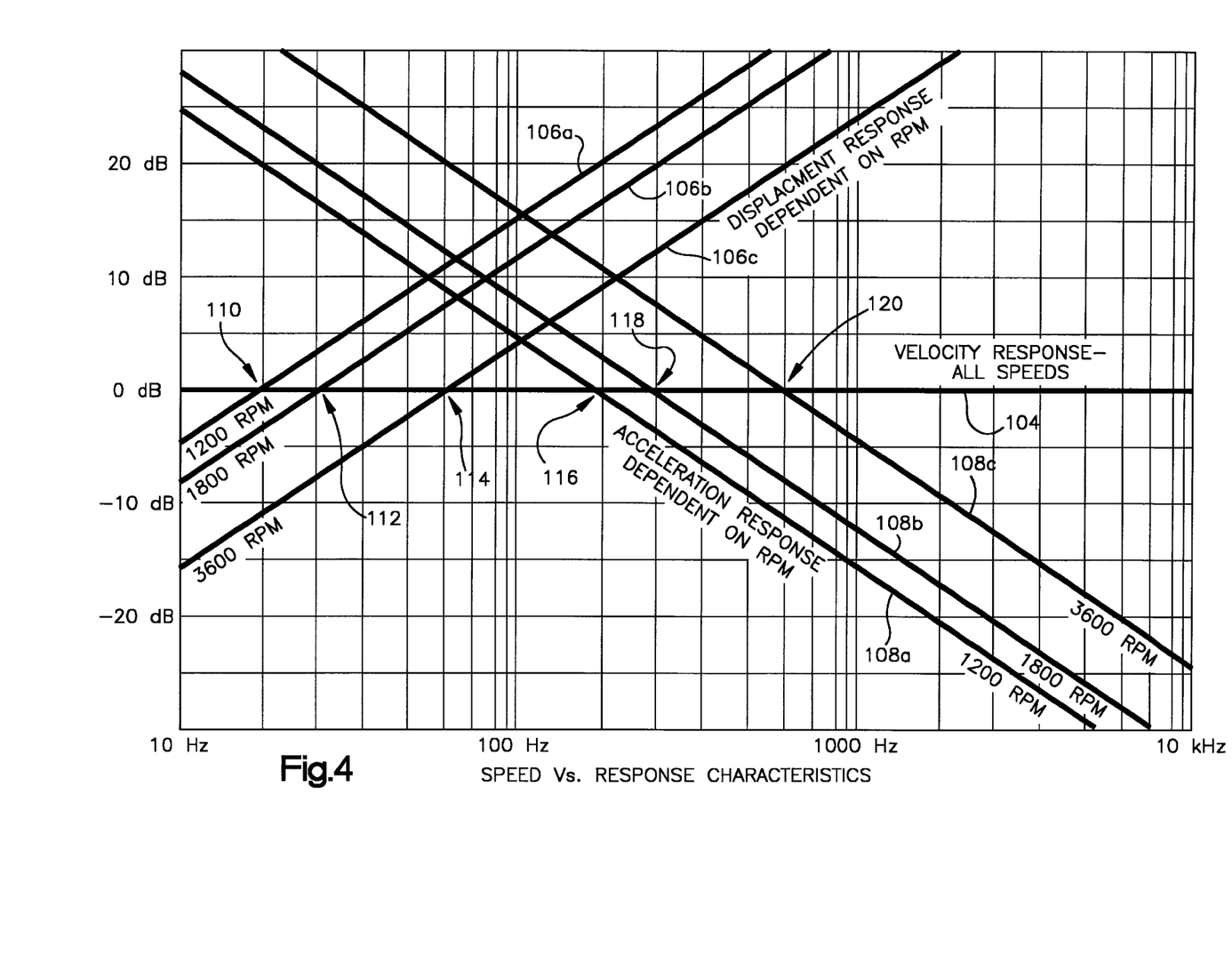
FIG. 4 is a diagram illustrating the response characteristics of the device with respect to the displacement, velocity and acceleration measurements as a function of the machine operating speed in accordance with the present invention.

Referring now to FIG. 4, the frequency response characteristics of the device 20 for acceleration, velocity and displacement are shown as a function of the operating speed of the machine under test. The abscissa in the graph shown in FIG. 4 represents the operating speed of the machine under test in hertz (e.g., 1200 rpm=20 Hz; 1800 rpm=30 Hz; 3600 rpm=60 Hz). The ordinate represents the rms level of the respective measurand in db.

FIG. 4 illustrates the response characteristics for measured acceleration, velocity and displacement at 1200, 1800 and 3600 rpm. The response characteristics for a machine at 900 rpm have been omitted to facilitate viewing at the other speeds. In the exemplary embodiment, the gain for the velocity measurement VEC is the same at each of the operating speeds. In other words, the controller 68 sets the gain of the adjustable scaler 78 to the same value at each of the different operating speeds. As a result, the response characteristics for the measured velocity VEC are the same at each of the operating speeds and are represented by line 104.

In FIG. 4, the response for the measured velocity VEC is selected as a reference and is shown as being coincident along the 0 db line. As a result of the integrator/filter 82, the measured displacement response characteristics will have a slope of 6db/octave relative to the velocity response characteristics. Similarly, the measured velocity response characteristics will have a slope of 6 db/octave relative to the acceleration response characteristics as a result of the integrator/filter 74. Lines 106a–106c represent the displacement response characteristics for speeds of 1200, 1800 and 3600 rpm, respectively. Lines 108a–108c represent the acceleration response characteristics for speeds of 1200, 1800 and 3600 rpm, respectively. As will be appreciated, the points at which the line 106 representing the displacement response characteristics and the line 108 representing the acceleration response characteristics cross or intersect the line 104 representing the velocity response characteristics will depend on the particular gains of the adjustable scalers 72 and 88 compared to the adjustable scaler 80. Stated another way, the line 106 representing the displacement response characteristics will tend to shift to the left if the gain provided by the adjustable scaler 86 is increased and to the right if the gain is decreased. Conversely, the line 108 representing the acceleration response characteristics will shift to the right if the gain provided by the adjustable scaler 66 is increased and will shift to the left if the gain is decreased.

The portable monitoring device 20 makes use of the changes in the response characteristics as a result of such scaling in order to meaningfully relate the three measurands at different operating speeds to provide information about the frequency content of the vibration signal. In the exemplary embodiment, the gain for the adjustable scaler 88 is predetermined relative to the velocity response characteristics such that the line 106 intersects the line 104 at ×1 the operating speed of the machine under test. Thus, for example, the gain for the adjustable scaler 88 at 1200 rpm is preselected so that the line 106a intersects line 104 at point 110 located at 20 Hz. Similarly, the respective gains for the adjustable scaler 88 at 1800 rpm and 3600 rpm are predetermined so that the lines 106b, 106c intersect the line 104 at points 112, 114 located at 30 Hz and 60 Hz, respectively.

Also in the exemplary embodiment, the gain for the adjustable scaler 72 is predetermined relative to the velocity response characteristics such that the line 108 intersects the line 104 at ×10 the operating speed of the machine under test. Thus, for example, the gain for the adjustable scaler 72 at 1200 rpm is preselected so that the line 108a intersects line 104 at point 116 located at 200 Hz. Similarly, the respective gain for the adjustable scaler 72 at 1800 rpm and 3600 rpm are predetermined so that the lines 108b, 108c intersect the line 104 at points 118, 120 located at 300 Hz and 600 Hz, respectively.

Figure 5:
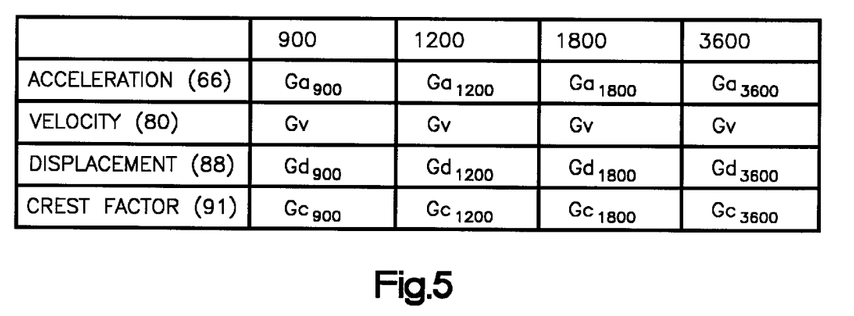
FIG. 5 is a look-up table illustrating the different gain values which are employed by the portable vibration monitoring device in order to scale the displacement, velocity, acceleration and crest factor measurements as a function of operating speed in accordance with the present invention.

The particular gains may be predetermined via calibration of the device 20 as will be appreciated. The control values representing the gains are then stored in the memory 96 as discussed above. FIG. 5 represents a look-up table containing the predetermined gains as stored in the memory 96. As mentioned above, the gain of the adjustable scaler 80 is set to be the same (Gv) for each of the operating speeds. The values $Ga_{900}$, $Ga_{1200}$, $Ga_{1800}$ and $Ga_{3600}$ are applied by the adjustable scaler 66 and are chosen to provide the aforementioned displacement-velocity response characteristic intersections at points 116, 118, 120, etc. The values $Gd_{900}$, $Gd_{1200}$, $Gd_{1800}$ and $Gd_{3600}$ are applied by the adjustable scaler 88 and are chosen to provide the aforementioned displacement-velocity response characteristic intersections at points 110, 112, 114, etc.

Figure 6:
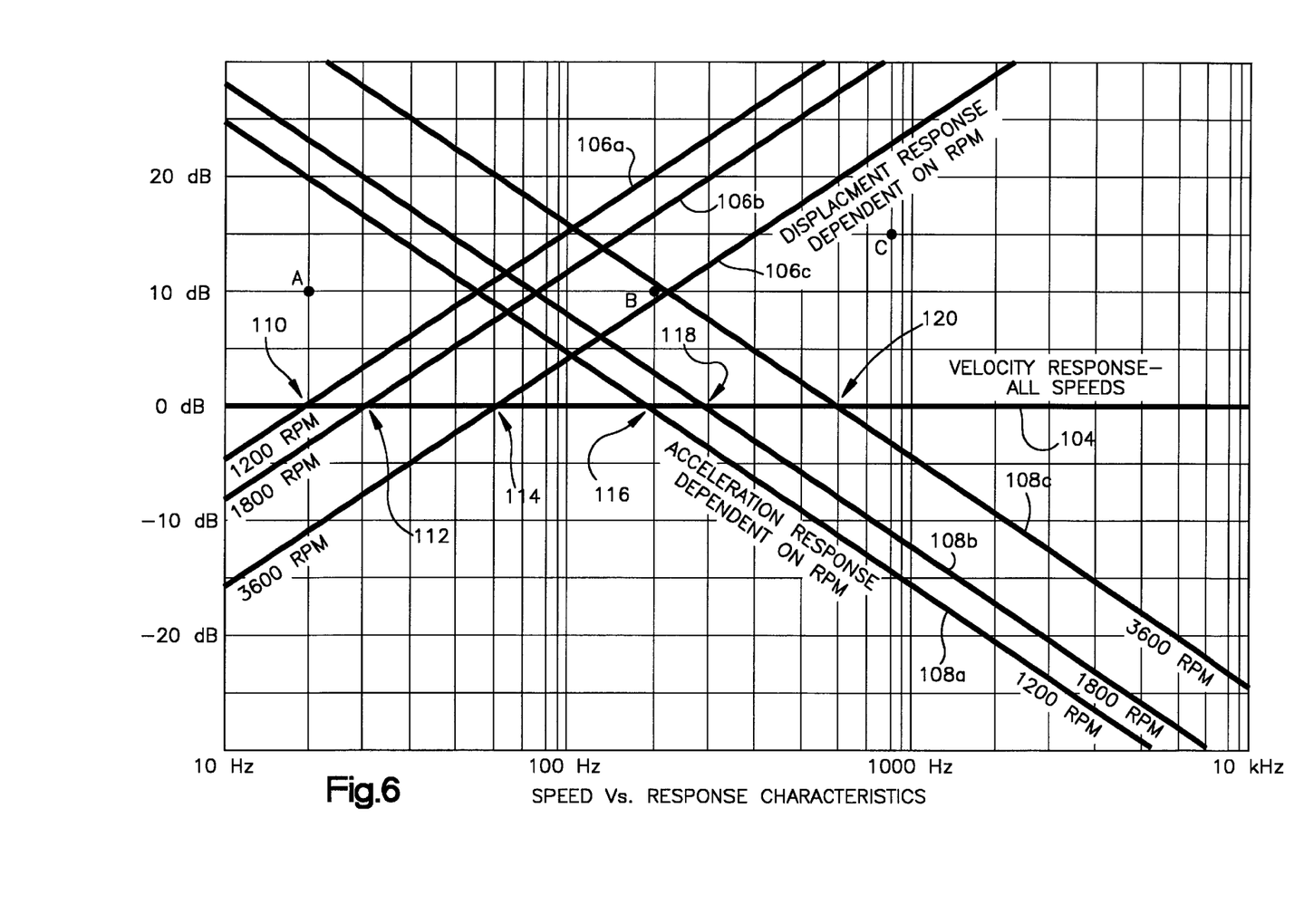
FIG. 6 illustrates, for comparison, three different points A–C on a response diagram of the type shown in FIG. 4.

Using the adjustable scaling in relation to the displacement and acceleration response characteristics allows determination of the frequency of the controlling peak in the output of the transducer 24. For example, FIG. 6 shows the frequency response diagram of FIG. 4 with sample points A, B and C. The bargraph drivers 72, 80, and 88 together with the bargraphs 30, 31, and 32 are configured with the appropriate threshold settings such that the signal levels corresponding to lines 104, 106 and 108 coincide with the color threshold line 38 (FIG. 1) in the bargraphs 30–32. Thus, a frequency peak appearing above the velocity response line 104 will illuminate a corresponding number of red segments 36 above the threshold line 38 in the bargraph 31. Likewise, a frequency peak appearing above the displacement response line 106 or acceleration response line 108 will illuminate a corresponding number of amber segments 36 above the threshold line 38 in the bargraphs 30 and 32. A frequency peak appearing below the respective lines will result in a corresponding number of segments 36 below the threshold line 38 not being illuminated in the respective displays.

Figure 7A:
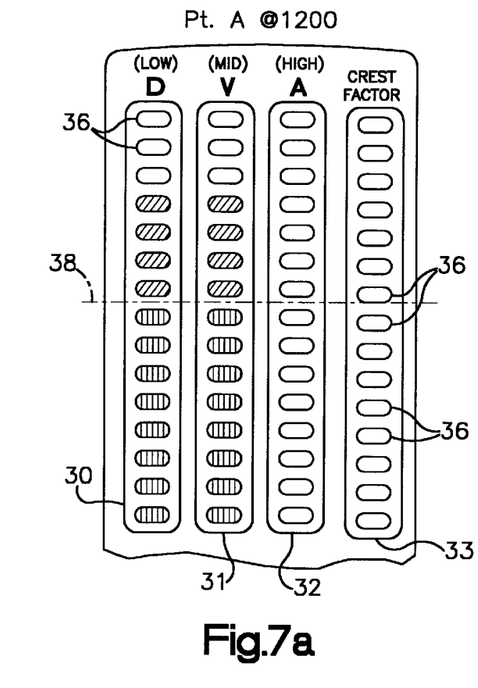
FIGS. 7(a), 7(b) and 7(c) illustrate exemplary displays produced as a result of measurements at points A–C, respectively, in FIG. 6 for a 1200 rpm machine.
Figure 7B:
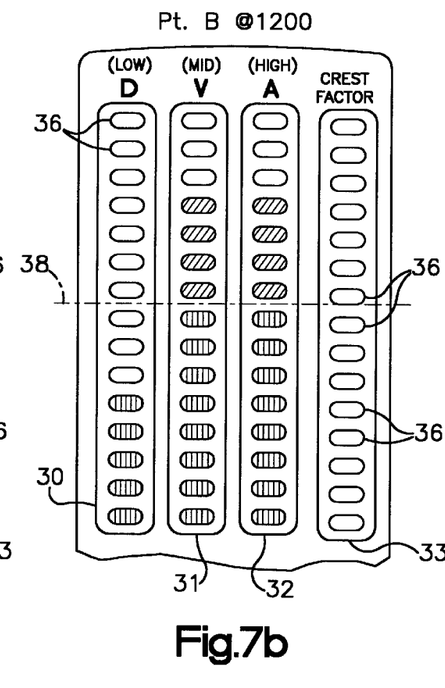
Figure 7C:
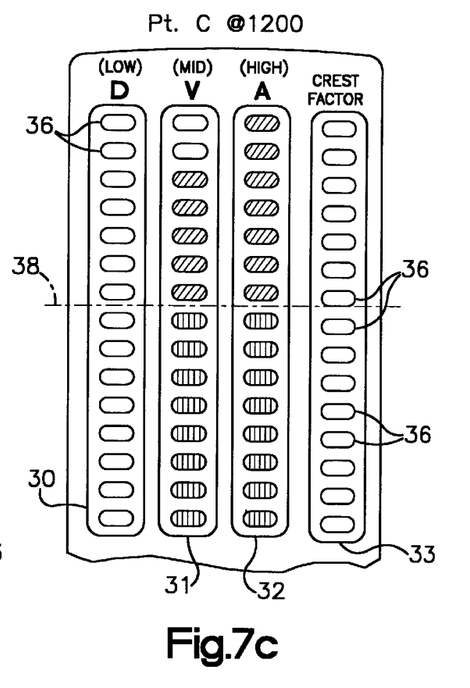

FIGS. 7(a)–7(c) represent exemplary approximated displays of the device 20 with respect to a measured vibration peak occurring at points A–C of FIG. 6 for a 1200 rpm machine (i.e., 1200 rpm is selected via the switches 40). Notice that the level at A exceeds the velocity and displacement lines 104 and 106a by the same amount and hence, as shown in FIG. 7(a), the velocity and displacement bargraphs 30, 31 are at the same level. The acceleration bargraph 32, on the other hand, shows a significantly lower level as point A is well below the acceleration line 108a and is actually off scale (too low) on the bargraph 32. Such "weighting" of the illuminated bargraph segments 36 towards the left indicates that the frequency of the controlling peak is located approximately at ×1 the operating speed of the machine under test, or towards a "low" frequency band. This is logical as a vibration peak at a rotation rate, if significantly large as might be caused by imbalance of the machine under test, would control the displacement, velocity and acceleration overall vibration levels.

If instead the high vibration peak for a 1200 rpm machine were to occur at point B as shown in FIG. 6, the device 20 would produce a display similar to that shown in FIG. 7(b). In such case, the acceleration and velocity bargraphs 32 and 31 would be at the same level, while the displacement level of bargraph 30 would be much lower. Hence, the illuminated bargraph segments 36 tend to be "weighted" towards the right as shown in FIG. 7(b). This is indicative of the controlling frequency being located at about ×10 the operating speed of the machine under test, or towards a "high" frequency band.

Still further, if the high vibration peak for a 1200 rpm machine were to occur at point C as shown in FIG. 6 the device 20 would produce a display similar to that shown in FIG. 7(c). In such case, the acceleration bargraph 32 level exceeds the level of the velocity bargraph 31, while the displacement level of bargraph 30 would be much lower and in fact is off scale (too low) to be shown on the bargraph 30. Hence, the illuminated bargraph segments 36 tend to be heavily "weighted" towards the right as shown in FIG. 7(b). This is indicative of the controlling frequency being located much beyond ×10 the operating speed of the machine under test.

Figure 8A:
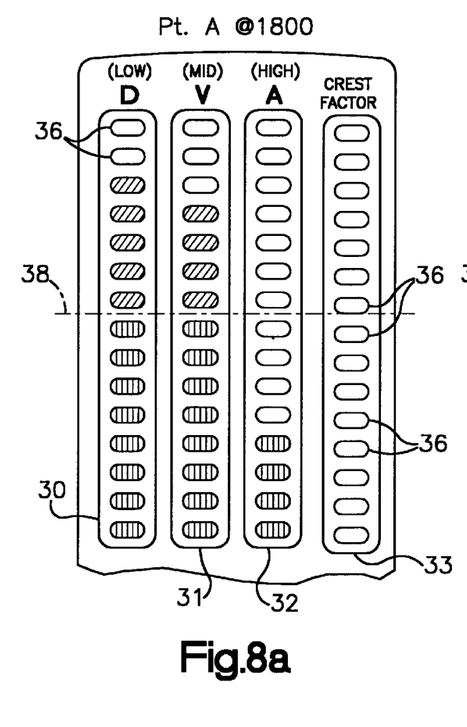
FIGS. 8(a), 8(b) and 8(c) illustrate exemplary displays produced as a result of measurements at points A–C, respectively, in FIG. 6 for an 1800 rpm machine.
Figure 8B:
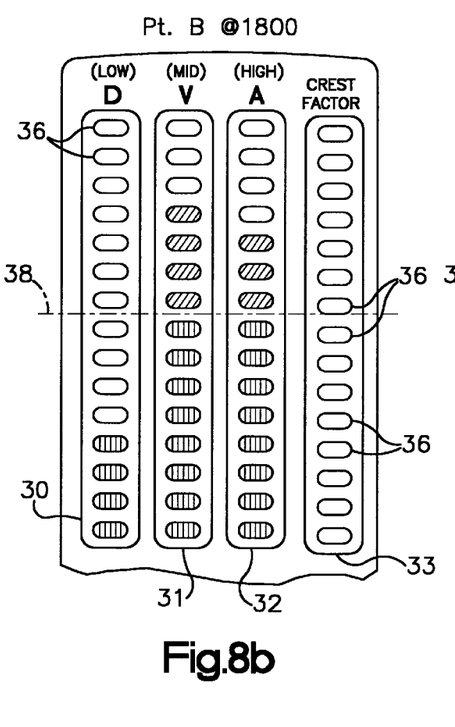
Figure 8C:
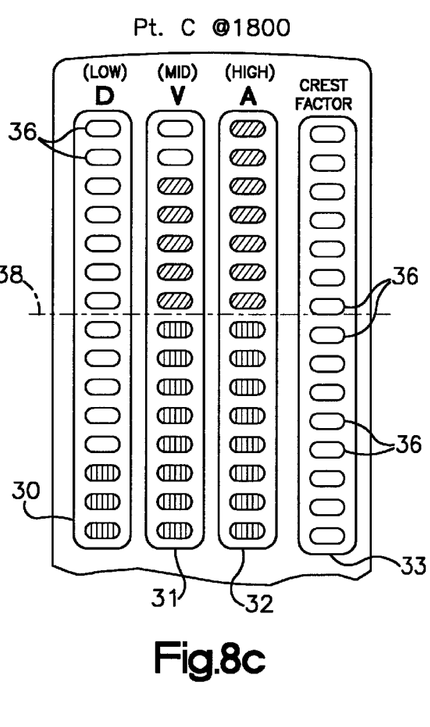
Figure 9A:
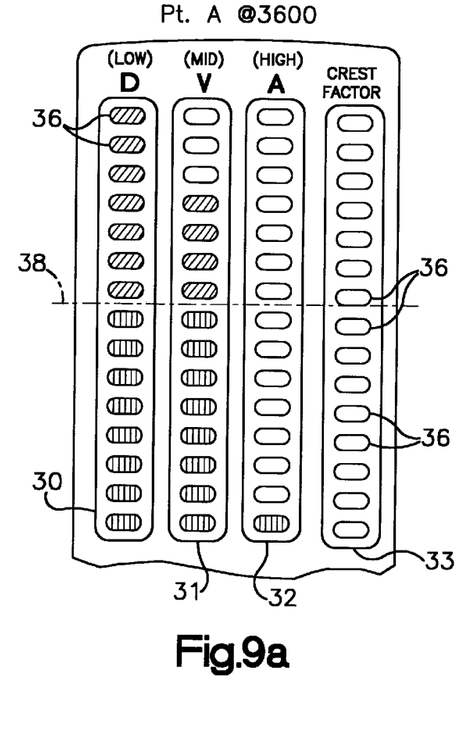
FIGS. 9(a), 9(b) and 9(c) illustrate exemplary displays produced as a result of measurements at points A–C, respectively, in FIG. 6 for a 3600 rpm machine.
Figure 9B:
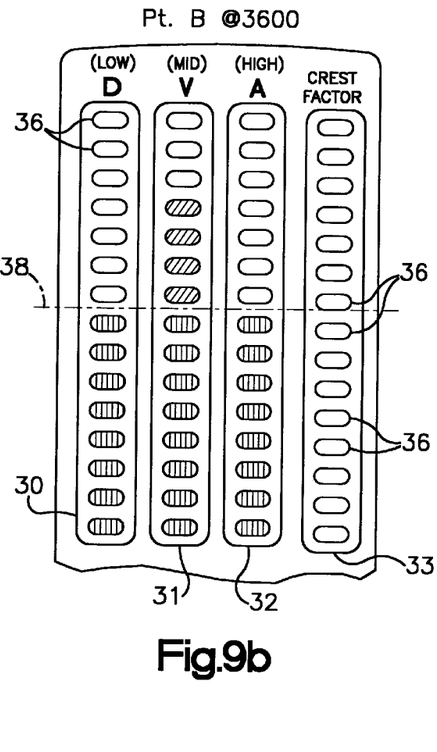
Figure 9C:
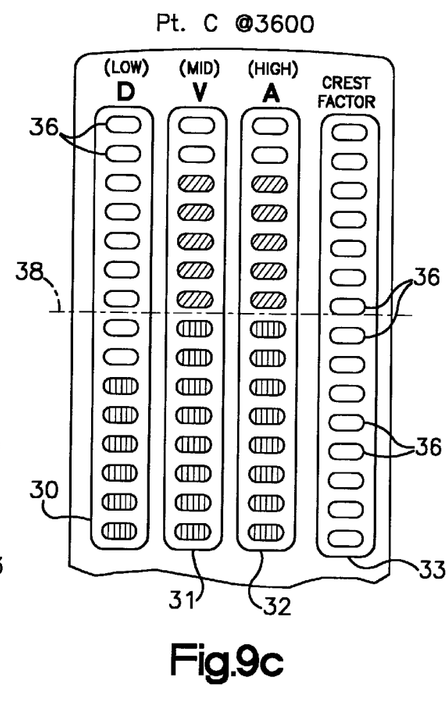

Similar displays for points A, B and C are respectively shown in FIGS. 8(a)–8(c) for a machine operating at 1800 rpm. In this case, the adjustable scalers 66 and 86 (FIG. 3) utilize different gain values corresponding to lines 106b and 108b in FIG. 6. As will be appreciated, point A is located below the ×1 operating speed at 1800 rpm. Hence, the display shown in FIG. 8(a) tends to have illuminated elements 36 which are weighted more so to the left as compared to FIG. 7(a). Similar comparisons can be made with respect to FIGS. 8(b) and 8(c). Likewise, FIGS. 9(a)–9(c) exemplify the display produced by the device 20 for points A, B and C at an operating speed of 3600 rpm.

Accordingly, it will be appreciated that due to the adjustable scaling of the acceleration, velocity and displacement measurements, the device 20 is capable of displaying such measurands in a format which is indicative of the frequency content. A display on the bargraphs 30–32 which is weighted towards the left indicates a controlling peak in the vibration signature of approximately ×1 the operating speed or less. A display on the bargraphs 30–32 which is weighted towards the right indicates a controlling peak in the vibration signature of approximately ×10 the operating speed or more. Thus, it will be appreciated that the bargraphs 30–32 are generally indicative of low, medium and high frequency content, respectively. Such information is useful in determining with more precision the condition of a machine under test.

Figure 10A:
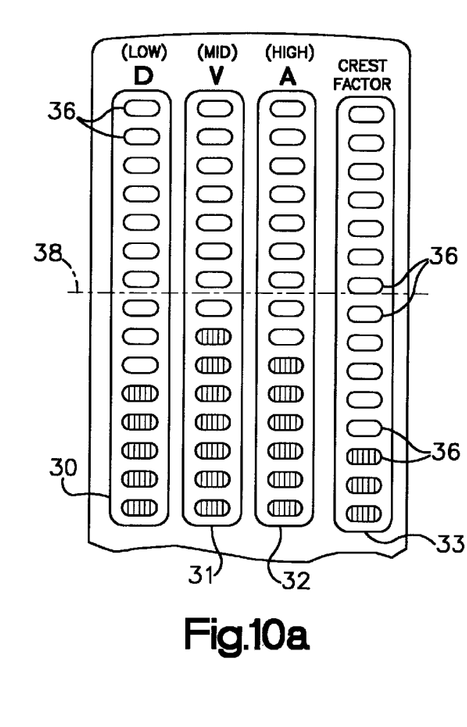
FIGS. 10(a), 10(b), 10(c), 10(d), 10(e) and 10(f) illustrate exemplary displays representing satisfactory machine condition, imbalance, misalignment, general fault, early stage bearing deterioration, and late stage bearing deterioration, respectively.

For example, FIG. 10(a) represents an exemplary display for a machine which is in good condition. Acceptable vibration levels are indicated by green segments 36 being illuminated in the bargraphs 30–32, with none of the bargraphs 30–32 exceeding the threshold line 38. Hence, no serious faults should be present in the machine. The crest factor CF is shown as being about 6 db. This is an acceptable level, indicating no impacting from deteriorated bearings.

Figure 10B:
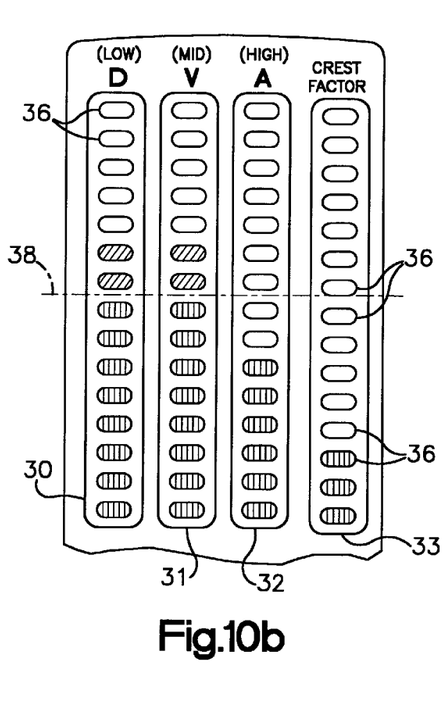

FIG. 10(b) illustrates a typical display indicating an imbalance in the machine under test. Unacceptable vibration levels are indicated by illuminated red segments 36 (above the threshold line 38) on the bargraph 31 corresponding to mid range frequencies. The illuminated yellow (or amber) segments 36 on the bargraph 30, corresponding to lower frequencies, allow an estimation of the controlling vibration frequency. If the levels of the bargraphs 30 and 31 are equal it strongly indicates that the high vibration level is occurring at the rotation rate of the machine. This is indicative of an imbalance condition when measured in the radial direction. (See, e.g., discussion above in connection with FIG. 7(a)). The crest factor CF is about 6 db. This is an acceptable level, indicating no impacting from deteriorated bearings.

Figure 10C:
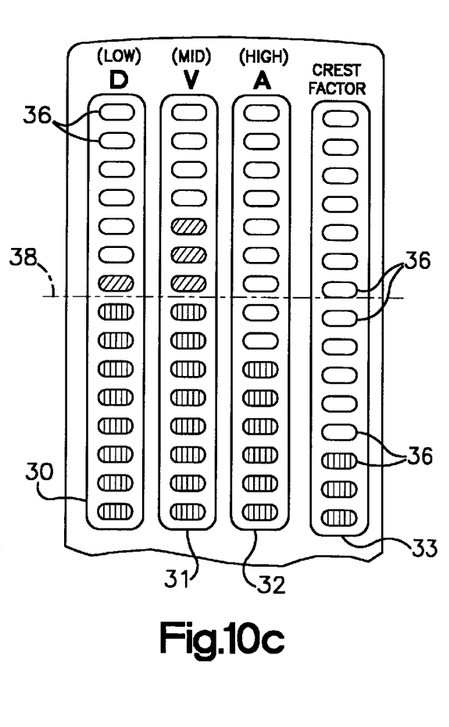

FIG. 10(c) illustrates a typical display indicative of misalignment of the machine under test. Unacceptable vibration levels are indicated by red segments in the bargraph 31 representing the mid range frequencies. The yellow segments 36 in the in the bargraph 30 representing the low range frequencies allow an estimation of the vibration frequency. If the level on the bargraph 30 is about 6 db less than the bargraph 31, it strongly indicates that the high vibration level is occurring at twice the rotation rate of the machine. This is indicative of a misalignment condition when measured in the radial direction. The crest factor CF is about 6 db. This is an acceptable level, indicating no impacting from deteriorated bearings.

Figure 10D:
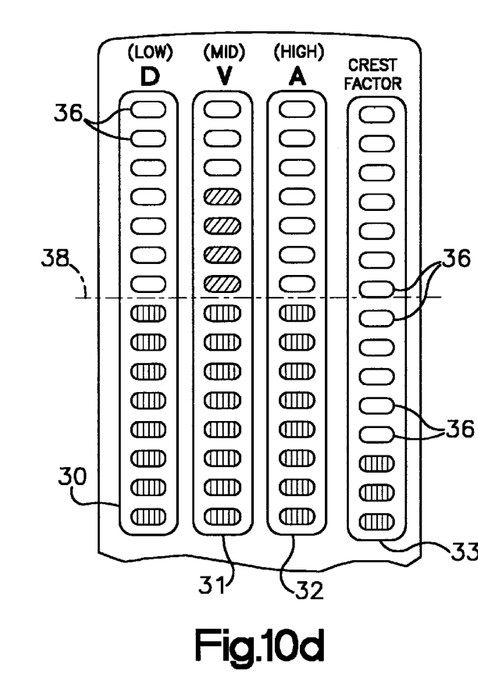

FIG. 10(d) represents a typical display indicating a general fault in the machine under test. Unacceptable vibration levels are indicated by red segments in the bargraph 31 representing the mid range frequencies. Since neither the low frequency bargraph 30 nor the high frequency bargraph 32 show high levels, the frequency of the fault is between three to nine times the rotation speed of the machine. Often, this could indicate a problem with a pump impeller or fan assembly. Bearing tones fall into this frequency range as well, but deteriorated bearings are unlikely because the crest factor is only 6 db. If bearings are at the early stages of deterioration, the crest factor will be 9 to 12 db. As bearing deterioration continues, the crest factor may decrease, but the high frequency vibration level will rise.

Figure 10E:
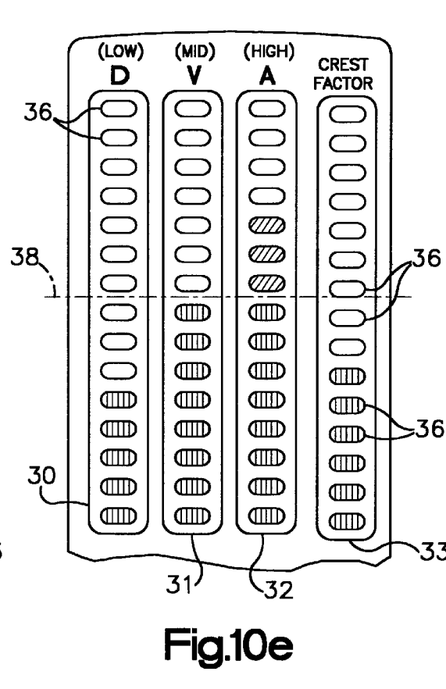

FIG. 10(e) shows a typical display indicative of early stage bearing deterioration. Overall mid range vibration levels on the bargraph 31 may not be as high as the unacceptable level, but the vibration levels on the high range bargraph 32 will be somewhat elevated. The clue that this is a bearing deterioration condition is the high crest factor, of 12 db. This is a result of impacting as the bearing elements roll over defects.

Figure 10F:
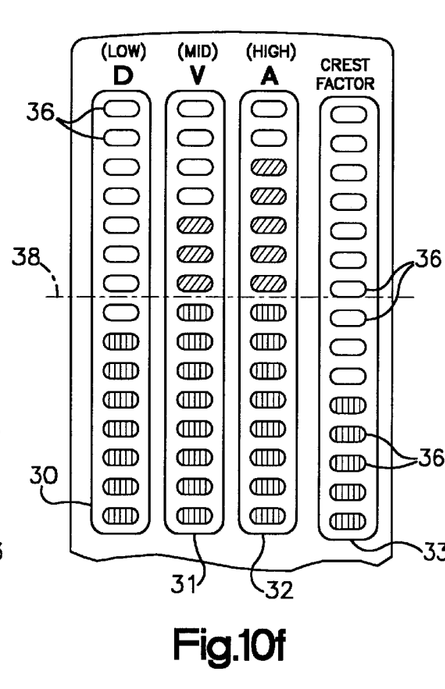

FIG. 10(f) represents a typical display showing late stage bearing displacement. Unacceptable vibration levels are indicated by red segments illuminated on the mid range bargraph 31. The high frequency bargraph 32 indicates very high vibration levels, resulting from the continued deterioration of the bearing. The crest factor (e.g., of 10 db) may drop as compared to earlier stages of bearing deterioration, as impacts are replaced by grinding of the bearing material.

It will therefore be appreciated that the portable monitoring device 20 in accordance with the present invention relates the acceleration, velocity and displacement measurements to display information indicative of the frequency content of the vibration signature. The device 20 does not require high cost components capable of calculating the FFT of the vibration measurement or the like. Rather, simple scaling of the acceleration, velocity and displacement measurements relative to one another produces a display which is indicative of the frequencies of the vibration peaks. Such frequency content information assists in diagnosing the condition of a machine. Conventional low cost portable devices simply provided single broadband vibration levels which were not indicative of the frequencies involved.

Although the invention has been shown and described with respect to certain preferred embodiments, it is obvious that equivalents and modifications will occur to others skilled in the art upon the reading and understanding of the specification. For example, the displacement-velocity and acceleration-velocity crossover points in the above discussed embodiment were selected as ×1 and ×10 the operating speed, respectively. However, other values may be selected without departing from the scope of the invention. The crossover at ×10 was selected as most pump impellers, fan wheels, etc. have 10 or less elements. However, such choice is somewhat arbitrary as will be appreciated.

Furthermore, it will be noted that the acceleration and displacement measurements were scaled relative to the vibration measurements in accordance with the exemplary embodiment. However, it will be appreciated that some other combination may also be selected. For example, the displacement and velocity measurements may be scaled relative to the acceleration measurement. By scaling the acceleration, velocity and displacement measurements relative to each other in a known manner so as to have different responses with respect to frequency, the device 20 provides a display which becomes indicative of the frequency content of the vibration signature.

Although the acceleration, velocity and displacement measurements are displayed via bargraphs 30–32 other display means may be employed without departing from the scope of the invention. For example, the respective levels may be shown using conventional VU meters or the like. In another embodiment, the display 44 has four digits with each of the digits respectively corresponding to one of the displays 30–33. Each digit represents the number of segments illuminated on the bargraph directly above it. Positive numbers represent segments above the threshold line 38 (amber or red segments 36), and negative numbers represent segments below the line. In the case of the crest factor display 33, a positive number indicates the number of segments from the bottom segment of the display 33. Thus, a single four digit number on the display 44 represents the health of the machine, and represents all of the information available on the bargraph above. The condition represented by FIG. 10(f), for example, becomes −1, 3, 5, 5 in this format. Such four digit number represents a "quicktrend" number, which can be easily compared with the "quicktrend" number from subsequent/future measurements. The controller 68 is programmed to drive the display 44 in such manner in response to a "quicktrend" function button (not shown) being depressed by the operator, for example. The controller 68 generates the "quicktrend" number by sampling the outputs of the bar drivers or the adjustable scalers 66 (not shown).

Again, however, the respective levels of the signals will be indicative of the frequency content. This frequency content information thus makes it possible to discriminate between different types of problems which may be affecting a machine. By adjusting the gain values applied to each of the measurands, the device 20 may be used for machines at various different operating speeds. In another embodiment, the controller 68 may be programmed to allow the operator to select from a whole range of operating speeds. The controller 68 will store in the memory 96 the corresponding gain values for each of the possible operating speeds.

The present invention includes all such equivalents and modifications, and is limited only by the scope of the following claims.

What is claimed is:

1. A portable vibration monitoring device, comprising:
   a portable housing;
   a transducer which may be mounted to a machine under test, the transducer providing an output signal representative of the movement of the machine;
   at least one integrator within the housing for processing the output signal to produce three measurands corresponding respectively to measured acceleration, velocity and displacement of the machine;
   scaling circuitry within the housing for scaling levels of the three measurands relative to each other according to a predetermined relationship; and
   a display exposed via the housing for displaying the scaled levels of the three measurands in a manner which is indicative of a particular frequency content of the output signal.

2. The device of claim 1, wherein the scaling circuitry comprises at least one filter for filtering at least one of the measurands so as to have different frequency response characteristics compared to at least another of the measurands.

3. The device of claim 2, wherein each of the measurands has different frequency response characteristics compared to the other measurands.

4. The device of claim 1, wherein the scaling circuitry comprises at least one filter such that the frequency response characteristics of the velocity measurand and the displacement measurand are represented by respective curves which intersect at a first predetermined frequency, and the frequency response characteristics of the velocity measurand and the acceleration measurand are represented by respective curves which intersect at a second predetermined frequency.

5. The device of claim 4, wherein the second predetermined frequency is greater than the first predetermined frequency.

6. The device of claim 1, wherein the scaling circuitry comprises at least one adjustable scaler for scaling at least one of the three measurands in response to an operator input indicative of an operating speed of the machine.

7. The device of claim 6, wherein the at least one adjustable scaler comprises a separate adjustable scaler for each of the three measurands.

8. The device of claim 7, further comprising a memory for storing gain values for adjusting a gain of the adjustable scalers as a function of the operating speed.

9. The device of claim 1, wherein the display comprises three bargraphs each displaying a respective one of the scaled measurands.

10. The device of claim 9, wherein displayed levels of the three bargraphs are indicative of the particular frequency content.

11. The device of claim 10, wherein the displayed level of a first of the three bargraphs is indicative of relatively low frequencies compared to the displayed level of a second of the three bargraphs which is indicative of relatively high frequencies.

12. The device of claim 11, wherein the displayed level of a third of the three bargraphs is indicative of mid frequencies between the relatively low frequencies and the relatively high frequencies.

13. The device of claim 1, further comprising a circuit for computing a crest factor from the output signal.

14. The device of claim 13, wherein the display also displays the crest factor.

15. The device of claim 1, wherein the predetermined relationship comprises:
the scaled displacement measurand and the scaled velocity measurand being significantly higher than the scaled acceleration measurand and the scaled displacement measurand being equal or higher than the scaled velocity measurand, when the frequency of the controlling peak is located towards a low frequency band;
the scaled velocity measurand and the scaled acceleration measurand being greater than the scaled displacement measurand and the scaled acceleration measurand being less than or equal to the scaled velocity measurand, when the frequency of the controlling peak is located towards a mid frequency band; and
the scaled acceleration measurand and the scaled velocity measurand being significantly higher than the scaled displacement measurand and the scaled acceleration measurand being higher than the scaled velocity measurand when the frequency of the controlling peak is located towards a high frequency band.

16. The device of claim 15, wherein the scaled displacement measurand and the scaled velocity measurand are the same when the frequency of the controlling peak is the same as the frequency of the machine.

17. A portable vibration monitoring device, comprising:
a portable housing;
a transducer which may be mounted to a machine under test, the transducer providing an output signal related to movement of the machine;
processing circuitry within the housing for deriving acceleration, velocity and displacement measurands based on the output signal;
scaling circuitry within the housing for scaling levels of the measurands relative to each other according to a predetermined relationship; and
a display exposed via the housing for displaying the scaled levels of the measurands in a manner which is indicative of a particular frequency content of the output signal.

18. The device of claim 17, wherein the display comprises three bargraphs each displaying a respective one of the scaled measurands.

19. The device of claim 18, wherein displayed levels of the three bargraphs are indicative of the particular frequency content.

20. The device of claim 19, wherein the displayed level of a first of the three bargraphs is indicative of relatively low frequencies compared to the displayed level of a second of the three bargraphs which is indicative of relatively high frequencies.

21. The device of claim 20, wherein the displayed level of a third of the three bargraphs is indicative of mid frequencies between the relatively low frequencies and the relatively high frequencies.

22. The device of claim 17, wherein the predetermined relationship comprises:
the scaled displacement measurand and the scaled velocity measurand being significantly higher than the scaled acceleration measurand and the scaled displacement measurand being equal or higher than the scaled velocity measurand, when the frequency of the controlling peak is located towards a low frequency band;
the scaled velocity measurand and the scaled acceleration measurand being greater than the scaled displacement measurand and the scaled acceleration measurand being less than or equal to the scaled velocity measurand, when the frequency of the controlling peak is located towards a mid frequency band; and
the scaled acceleration measurand and the scaled velocity measurand being significantly higher than the scaled displacement measurand and the scaled acceleration measurand being higher than the scaled velocity measurand when the frequency of the controlling peak is located towards a high frequency band.

23. The device of claim 22, wherein the scaled displacement measurand and the scaled velocity measurand are the same when the frequency of the controlling peak is the same as the frequency of the machine.

24. A portable vibration monitoring device, comprising a transducer which may be mounted to a machine under test and processing circuitry which processes an output signal provided from the transducer;
wherein the processing circuitry derives acceleration, velocity and displacement measurands from the output signal, generates an estimate of frequency content based on overall acceleration, velocity and displacement level, and determines mechanical deficiencies of the machine based on the estimate of frequency content.

25. The device of claim 24, further comprising scaling circuitry which scales the measurands based on machine speed.

26. The device of claim 25, further comprising an input for inputting machine speed.

27. The device of claim 26, wherein the scaling circuitry comprises an adjustable scaler for each of the three measurands and a controller which controls the adjustable scalers based on machine speed.

28. The device of claim 27, further comprising a portable housing containing the processing circuitry, the scaling circuitry and the input for inputting machine speed.

29. The device of claim 28, further comprising a display exposed via the housing for displaying the scaled levels of the measurands in a manner which is indicative of a particular frequency content of the output signal.

30. The device of claim 25, wherein the scaling circuitry scales the measurands so that:

the scaled displacement measurand and the scaled velocity measurand being significantly higher than the scaled acceleration measurand and the scaled displacement measurand being equal or higher than the scaled velocity measurand, when the frequency of the controlling peak is located towards a low frequency band;

the scaled velocity measurand and the scaled acceleration measurand being greater than the scaled displacement measurand and the scaled acceleration measurand being less than or equal to the scaled velocity measurand, when the frequency of the controlling peak is located towards a mid frequency band; and the scaled acceleration measurand and the scaled velocity measurand being significantly higher than the scaled displacement measurand and the scaled acceleration measurand being higher than the scaled velocity measurand when the frequency of the controlling peak is located towards a high frequency band.

31. The device of claim 30, wherein the scaled displacement measurand and the scaled velocity measurand are the same when the frequency of the controlling peak is the same as the frequency of the machine.

32. A method of determining the condition of a machine, comprising:

mounting a transducer to the machine to provide an output signal related to movement of the machine;

processing the output signal to derive acceleration, velocity and displacement measurands;

generating an estimate of frequency content based on overall acceleration, velocity and displacement level; and determining mechanical deficiencies of the machine based on the estimate of frequency content.

33. The method of claim 32, wherein said determining step comprises scaling the acceleration, velocity and displacement measurands relative to machine speed and determining the condition of the machine based on a comparison of the scaled measurands.

34. The method of claim 33, further comprising the step of displaying the scaled levels of the measurands in a manner which is indicative of a particular frequency content of the output signal.

* * * * *